J. C. BAKER.
MANUFACTURE OF MILK FAT.
APPLICATION FILED DEC. 28, 1920.
1,413,092.
Patented Apr. 18, 1922.
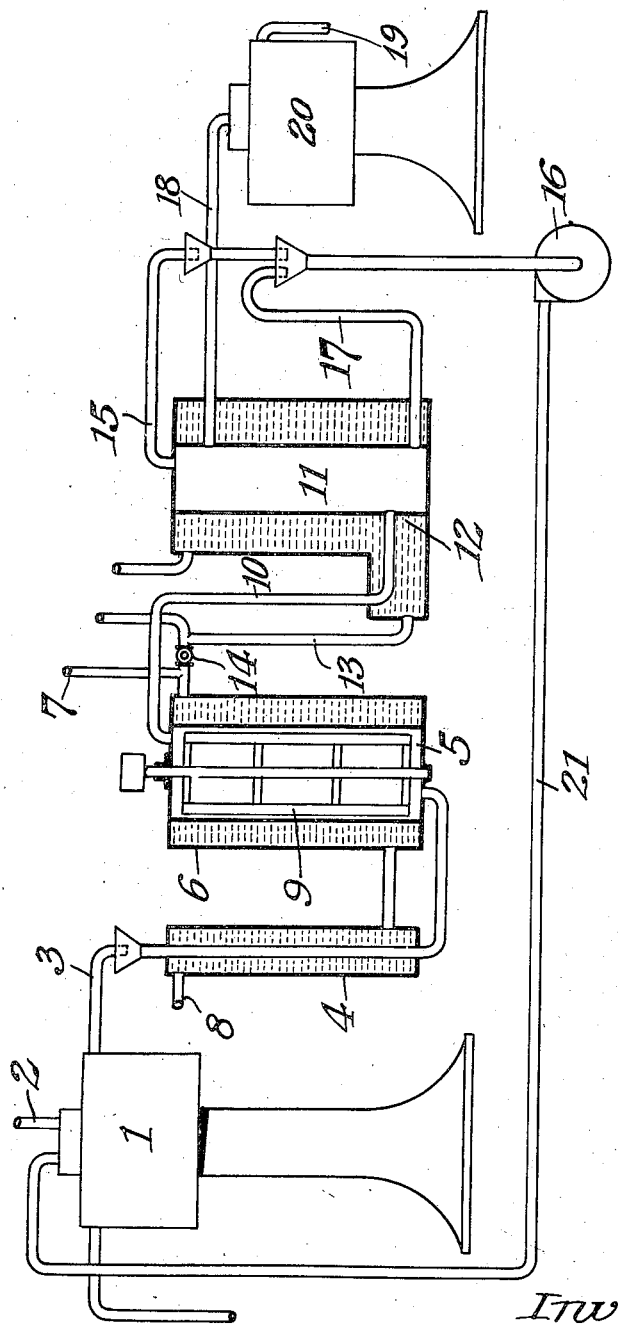

UNITED STATES PATENT OFFICE.

JOHN C. BAKER, OF RIDGEFIELD PARK, NEW JERSEY, ASSIGNOR TO ALBERT W. JOHNSTON, OF NEW YORK, N. Y.

MANUFACTURE OF MILK FAT.

1,413,092.         Specification of Letters Patent.      Patented Apr. 18, 1922.

Application filed December 28, 1920. Serial No. 433,612.

*To all whom it may concern:*

Be it known that I, JOHN CLARK BAKER, a citizen of the United States, residing at Ridgefield Park, county of Bergen, and State of New Jersey, have invented certain new and useful Improvements in the Manufacture of Milk Fat, of which the following is a full, clear, and exact description.

In the manufacture of milk or butter fat oil as heretofore practiced it has been proposed to separate the cream from whole milk, to then cool and churn the cream to produce butter, to then recover the butter with such substances as it may contain, melt and finally to pass the melted mixture through an oil separator. A similar process to this has also been proposed in which the cream in lieu of being churned to butter has been merely thickened and then heated in substantially the same manner. Both processes have been or are capable of being carried out continuously.

Whatever the merits of these processes may be, they may not be carried out economically and hence commercially, and therefore have made no impression on the art. They are open to the very serious objection that after a few pounds of oil have been obtained a clogging or plugging of the oil separator occurs which results in the subsequent production of a cloudy oil, very low yield and a most uneconomical plant efficiency.

My experiments in connection with this art and my study of the difficulties which are encountered in such processes as those above set forth have resulted in the discovery that the objections noted are due to the presence in the butter of two substances—cream and an emulsifying agent mixed with gases. Cream, I have found, will not pass through an oil separator, but will plug the bowl and cause the production of cloudy oil. The presence of gas in the butter, on the other hand, gives rise to the development of foam which rises to the top of the melted butter. This foam contains materials which result in the formation of an oil emulsion in the bowl of the separator which is analogous in character to what may be termed an oil jelly, which is not, strictly speaking, a fluid and causes a plugging of the bowl, with consequent production of cloudy oil and low yield.

I have overcome the practical difficulties to the carrying out of such processes, by effecting a preliminary separation of the butter or of the agitated and thickened cream from the other ingredients of the product of the primary separation of the milk, and this result I accomplish in substantially the following preferred manner.

The cream is first separated from the whole milk by any ordinary form of separator. It is then cooled and passed through an agitator or churn and then heated to a temperature above the melting point of the butter fat, but not up to the point of the coagulation of the proteins, or other substances present, such temperature being between 100° and 148° Fahrenheit, and preferably nearer the higher limit than the other.

The product of this step in the process is then run into a gravity separating chamber in which the foam rises to the top of the butter oil and the butter-milk settles to the bottom below the oil. Intermediate these strata is one of somewhat cloudy oil, and three outlets are provided through which the foaming oil, the cloudy oil and the butter-milk, respectively, are drawn off. The oil is then passed, either with or without the addition of hot water, through an oil separator which yields a clear and pure oil. The foam and the butter-milk and settlings, however, are at the same time drawn off either intermittently or continuously, and are returned to the whole milk on its passage to the cream separator.

The cream separator recovers from the milk mixed with these residues both fat and cream and discharges them together with the separated fresh cream from the new milk. This mixture is passed through the churn or the agitator after being properly cooled, and is then subjected to the further steps above set forth, and this process is continued until all of the obtainable fat is delivered in the form of a clear oil. At the end of a run any residue of foam, butter-milk and settlings which may be left can be saved and added to the whole milk used for the next run.

The process is most advantageously carried out as a continuous operation. In practice certain precautions should be taken and provisions made which greatly add to the efficiency of the process, but these will be described in connection with the detailed description of the drawing which follows:

The accompanying drawing is a diagrammatic illustration of the apparatus which I use in carrying out the above described process. All parts not illustrated in detail are well known devices in the art and require but little illustration and description.

The milk to be treated is introduced into a centrifugal cream separator 1 through a pipe 2, and the proper means are employed to drive the device. The separated cream issues through an outlet 3 and passes through a cool water jacket 4 into the bottom of a cylindrical chamber 5, itself surrounded with a water jacket 6, into which cool water is passed through an inlet pipe 7, which jacket is connected with the jacket 4, the latter being provided with an outlet or discharge pipe 8.

In the chamber 5 is a closed cylinder 9 mounted to revolve about a vertical axis and to be driven at a high rate of speed. The chamber is closed air-tight so that no air or gas can enter it along with the cream, and by this means I have found that the quantity of foam in the oil after melting is very materially reduced, if not avoided. By the revolution of the cylinder 9 the cream in the space surrounding the same is thickened as distinguished from being churned and this thickened cream passes off from the chamber by a pipe 10 by which it is carried into a gravity separating receptacle 11, through a warm water jacket 12 which surrounds said receptacle.

The water heated to the proper temperature is introduced into the jacket 12 by a pipe 13 and its temperature is controlled and regulated by means of a thermostat and other well known appliances so as to melt the contents of the receptacle 11 at about 140° F. After passing through this jacket the waste water is led off by a pipe 13 which has a controllable connection through a valve 14 with the cold water inlet 7, and by such means the temperature of the water introduced thereby may be exactly controlled by the amount of warm waste water admitted through this valve.

The gravity separator is provided with three outlets. The pipe 15 leads from the top and takes off the foaming oil and delivers it to a pump 16. The pipe 17 takes off the butter-milk and settlings and delivers the same to the pump 16, while the pipe 18 takes off the oil from the middle region of the receptacle and carries it to an oil separator 20 of proper and known construction, from which the clear oil is discharged by pipe 19, and the sediment drawn off or removed as it accumulates in any well known manner.

The pump 16 is or may be any suitable device which will force and deliver the products which it receives into the top of the cream separator 1, through a pipe 21.

I may state that the temperature to which the butter or agitated cream is subjected is a matter of great importance. Too high a temperature causes coagulation and a resultant clogging of the cream separator by the returned products which persist in such form. If high temperatures are desired the cream separator must be specially designed, as with a large sludge chamber, to provide for continuous and effective operation for any period of time.

On the other hand, if the temperature for melting be too low, there results a poor separation in the gravity separator, and poor separation of oil in the centrifuge. As stated above, I have found the most desirable temperature to be from 138° to 140° F.

In the above I have dealt with the conditions met with in the use of sweet milk and cream. Should the cream be slightly or fully sour coagulation of the proteins resulting will tend to plug the separators. This may be avoided by neutralizing the cream with lime or other alkali to the reaction of fresh milk P H—6.6 and pasteurizing, if so desired, and then following the process above described.

The process which I have above described is entirely satisfactory from the standpoint of quality and quantity of the milk fat produced. It extracts from a given quantity of milk quickly and thoroughly a very high percentage of the fat or oil in a pure, clear and anhydrous condition. It has the further advantage which no other similar process, to my knowledge possesses, that it returns into the skim-milk all the residue from the butter-milk, which results in a product much better adapted to the manufacture of milk powder than the ordinary skim-milk.

In this process the steps of agitating the cream to thicken it, or churning the cream to produce butter are, or may be, regarded as equivalent steps. I have described and in the claims I refer only to agitating the cream, but I understand that with this statement I make it clear that my claims include both steps and will be so construed.

Having now described my invention what I claim is:

1. The process herein described of obtaining milk fat which consists in separating the cream from whole milk, agitating the cream, heating the latter to a temperature sufficient to melt the fat, separating the oil from the butter-milk and other products, returning the latter to the whole milk to be separated and purifying the separated oil.

2. The continuous process of obtaining milk fat herein described, which consists in separating the cream from a given quantity of whole milk, agitating the cream, then heating it to a temperature sufficient to melt the fat, then separating the resulting oil from the foam, butter-milk and settlings, returning the latter to the body of whole milk to be separated, and purifying the oil.

3. In the process of obtaining milk fat herein described, the step of agitating the separated cream to be subsequently treated and excluding air or gas from the same while undergoing agitation.

4. The process herein described of obtaining milk fat, which consists in separating the cream mechanically from whole milk, agitating the cream, heating the thickened cream to a temperature not exceeding 140° F., separating the oil from the product by gravity, purifying the oil and returning the other ingredients of the product to the whole milk to be again passed through the cream separator.

5. The process herein described of obtaining milk fat, which consists in separating cream from whole milk, cooling and agitating the cream in an air- and gas-tight device, then heating the cream to a temperature sufficient to melt the fat, then passing the product to a gravity separator, drawing off the foam from above and the butter-milk from the oil in said separator, and returning them to the whole milk still to be separated and passing the oil through an oil separator.

In testimony whereof I hereto affix my signature.

JOHN C. BAKER.